US010067740B2

(12) United States Patent
Murillo et al.

(10) Patent No.: US 10,067,740 B2
(45) Date of Patent: Sep. 4, 2018

(54) MULTIMODAL INPUT SYSTEM

(71) Applicant: Microsoft Technology Licensing, LLC, Redmond, WA (US)

(72) Inventors: Oscar E. Murillo, Redmond, WA (US); Janet E. Galore, Seattle, WA (US); Jonathan C. Cluts, Sammamish, WA (US); Colleen G. Estrada, Medina, WA (US); Michael Koenig, Bellevue, WA (US); Jack Creasey, Redmond, WA (US); Subha Bhattacharyay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/151,157

(22) Filed: May 10, 2016

(65) Prior Publication Data

US 2016/0350071 A1 Dec. 1, 2016

Related U.S. Application Data

(63) Continuation of application No. 12/917,331, filed on Nov. 1, 2010, now Pat. No. 9,348,417.

(51) Int. Cl.
| | |
|---|---|
| *G06F 3/00* | (2006.01) |
| *G06F 3/16* | (2006.01) |
| *G06F 9/451* | (2018.01) |
| *G06F 3/01* | (2006.01) |
| *G06F 9/44* | (2018.01) |

(52) U.S. Cl.
CPC .............. *G06F 3/167* (2013.01); *G06F 3/017* (2013.01); *G06F 9/4443* (2013.01); *G06F 9/451* (2018.02); *G06F 2203/0381* (2013.01); *G06F 2203/0382* (2013.01)

(58) Field of Classification Search
CPC ................. G06F 2203/0381; G06F 2203/0382
See application file for complete search history.

(56) References Cited

U.S. PATENT DOCUMENTS

| | | | |
|---|---|---|---|
| 6,499,025 | B1 | 12/2002 | Horvitz et al. |
| 7,818,177 | B1 | 10/2010 | Bangalore et al. |
| 7,890,324 | B2 | 2/2011 | Bangalore et al. |
| 2003/0149803 | A1 | 8/2003 | Wilson |
| 2004/0021691 | A1 | 2/2004 | Dostie et al. |
| 2004/0128342 | A1 | 7/2004 | Maes et al. |
| 2006/0143216 | A1 | 6/2006 | Gupta et al. |
| 2008/0228496 | A1 | 9/2008 | Yu et al. |

(Continued)

OTHER PUBLICATIONS

"Final Office Action Issued in U.S. Appl. No. 12/917,331", dated Dec. 9, 2014, 17 Pages.

(Continued)

*Primary Examiner* — Andrew Bee

(57) ABSTRACT

The subject disclosure relates to user input into a computer system, and a technology by which one or more users interact with a computer system via a combination of input modalities. When the input data of two or more input modalities are related, they are combined to interpret an intended meaning of the input. For example, speech when combined with one input gesture has one intended meaning, e.g., convert the speech to verbatim text for consumption by a program, while the exact speech when combined with a different input gesture has a different meaning, e.g., convert the speech to a command that controls the operation of that same program.

20 Claims, 4 Drawing Sheets

(56) References Cited

U.S. PATENT DOCUMENTS

| | | |
|---|---|---|
| 2009/0049388 A1 | 2/2009 | Taib et al. |
| 2009/0089251 A1 | 4/2009 | Johnston et al. |
| 2009/0287626 A1 | 11/2009 | Paek et al. |
| 2010/0169246 A1 | 7/2010 | Jang et al. |
| 2010/0241431 A1 | 9/2010 | Weng et al. |
| 2010/0280983 A1 | 11/2010 | Cho et al. |
| 2011/0074573 A1 | 3/2011 | Seshadri |
| 2011/0161341 A1 | 6/2011 | Johnston |

OTHER PUBLICATIONS

"Final Office Action Issued in U.S. Appl. No. 12/917,331", dated Jul. 22, 2015, 13 Pages.

"Non Final Office Action Issued in U.S. Appl. No. 12/917,331", dated Mar. 30, 2015, 16 Pages.

"Non Final Office Action Issued in U.S. Appl. No. 12/917,331", dated Jun. 18, 2014, 13 Pages.

"Notice of Allowance Issued in U.S. Appl. No. 12/917,331", dated Jan. 25, 2016, 8 Pages.

Hui, et al., "Complementarity and Redundancy in Multimodal User Inputs with Speech and Pen Gestures", Retrieved at <<http://www.se.cuhk.edu.hk/hccl/publications/pub/os2b-2.pdf>>, 2009, pp. 4.

Beringer, et al., "PROMISE—A Procedure for Multimodal Interactive System Evaluation", Retrieved at <<http://www.smartkom.org/reports/Report-NR-23.pdf>>, 2002, pp. 7.

Johnston, et al., "Multimodal Language Processing for Mobile Information Access", Retrieved at <<http://www.research.att.com/people/Stent_Amanda_J/library/publications/Johnstonetal_02a.pdf>>, 2002, pp. 4.

Hui, et al., "Cross-Modality Semantic Integration with Hypothesis Rescoring for Robust Interpretation of Multimodal User Interactions", Retrieved at <<http://www.se.cuhk.edu.hk/hccl/publications/pub/tasl-hui-2011509.pdf>>, IEEE Transactions on Audio, Speech, and Language Processing, vol. 17, No. 3, Mar. 2009, pp. 486-500.

MULTIMODAL INPUT SYSTEM

CROSS-REFERENCE TO RELATED APPLICATION

This application is a continuation of U.S. application Ser. No. 12/917,331, filed Nov. 1, 2010. The entirety of which is hereby incorporated by reference herein.

BACKGROUND

Existing computer interface systems are able to support increasingly natural and complex user input. Handwriting and speech are typical examples of complex input, however contemporary gaming consoles are now able to detect user movements and interpret the movements as input. The Kinect™ for Microsoft's Xbox 360® uses camera and audio technology to sense input, without the need for a controller.

At present, known systems do not have the ability to handle multimodal input that may need to change in real-time according to the user's needs. Moreover, such systems cannot simultaneously leverage multiple input modalities in order to accurately interpret the user's intent. For example, while the system may be able to accept speech as input when running a speech application, or touch, or gesture, there is no way for existing systems to capture and interpret these modes together to act or disambiguate a user's request, command, or intent.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which one or more users can effectively interact with a computational system leveraging a combination of input modalities (e.g., speech, touch, 2D or 3D gesture), including synchronously or serially. The input modalities may be customized per-user, and may be adjusted in real-time according to the user's preferences and needs, possibly according to state data (e.g., sensed environmental conditions.

In one aspect, sets of input data corresponding to a plurality of input modalities are received. The input data are processed, which may determine that a first set of input data is related to a second set of input data. When related, the second set of input data is used to interpret an intended meaning of the first set of input data. The sets of data may be received by one user using different input devices, or from two users, each using an input device, for example.

In one aspect, to use the second set of input data to interpret the intended meaning of the first set of input data, a combined dictionary (e.g., speech and gesture to text) may be accessed. Other data may be used to help in the interpretation, including preference data and/or sensed data (e.g., of the current environment).

In one implementation, an input processor processes the raw data from a plurality of input devices (each corresponding to an input modality) into input events. A recommendation engine evaluates the input events to determine a user-intended meaning of a combination of at least two of the input events. A personalization engine may communicate with the recommendation engine to provide personalization information (e.g., maintained in dictionaries and/or preference data) that the recommendation engine uses in determining the user-intended meaning.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a technology by which a computer interface mechanism may sense multimodal and/or multiuser user input data, which are then processed to determine the input modality or modalities being attempted by a user. When multiple modalities are used, the modalities are considered in combination to interpret and clarify user intent.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in user input information processing in general.

Figure 1:
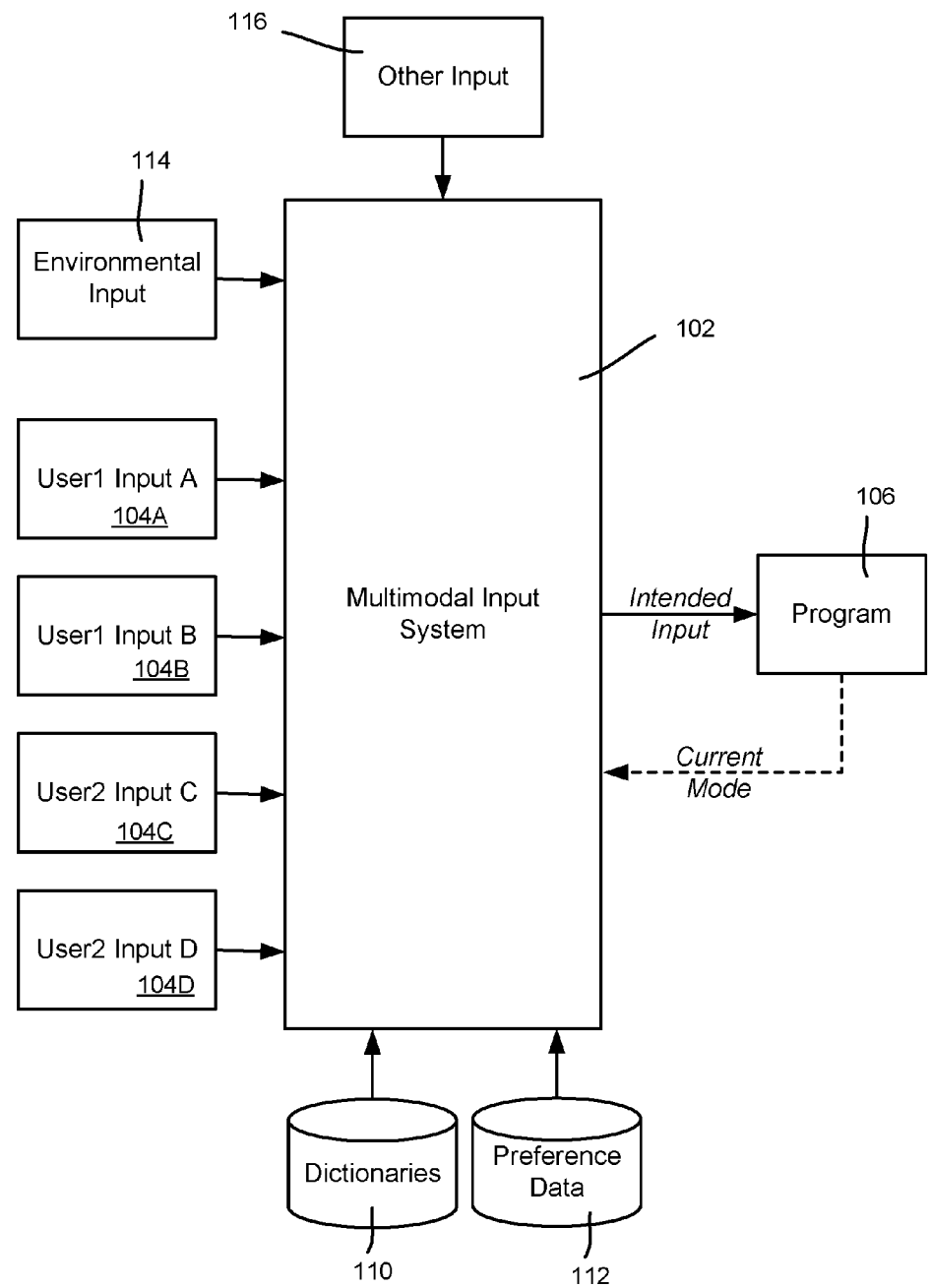
FIG. 1 is a block diagram representing example components of a multimodal input system.

FIG. 1 shows example components of a multimodal input system 102, in which a plurality of input mechanisms corresponding to one or more users provide user input 104A-104D to the multimodal input system 102. Note that the input from two users (User1 and User2) is shown in FIG. 1, however as little as one user, up to any practical number of users, may provide multimodal input. Moreover, the multimodal input system also may work with input from a single mode when only such input is provided by the user, or restricted by the system or a computer program. Note that the system accepts multimodal input and defines input modalities as part of program operations.

In general and as described below, the multimodal input system 102 determines the intent/intended meaning of the input of the user or users, and provides that input to a program 106. Note that the program 106 may be any operating system component, application and so forth. In one alternative, a program may implement its own multimodal interface; for example, a suite of applications such as Microsoft® Office may be provided that incorporates a multimodal interface. In another alternative, the multimodal input system 102 may be a component of a larger intention judgment system, or work in conjunction with a larger intention engine.

The user intent, as well as what is considered input versus what is not, may be based on dictionaries (libraries) 110 and/or preference data 112. For example, a speech dictionary, gesture dictionary, handwriting dictionary, command and control library, and so forth may be present, as well as one or more combined dictionaries (e.g., what various gestures mean when accompanied by speech). The dictionaries may be trained from general users and/or custom trained for a specific user, and may be predefined in whole or in part, such as a command and control library that recognizes only specific commands.

A dictionary may reside on the computer system that hosts the multimodal input system, in a remote computer system or systems ("cloud"), and/or an input device. For example, consider a remote user inputting video data such as for gesture interpretation. Instead of transmitting the video data to the multimodal input system, a device such as a smart phone can access a gesture dictionary for that user, and transmit a code corresponding to the looked-up gesture. A user that is on a system that does not have a dictionary for that user may retrieve the user's personal dictionary or dictionaries from a remote computer system.

What the system considers to be input versus what is not, as well as the user intent, may be based on preference data 112. Moreover, the system may restrict the multimodal inputs allowed to suit the program. For example, while voice commands are accepted at all times, during a game the user may have to gesture to select an icon or an answer rather than provide a spoken answer.

Still further, environmental input 114 may be used by the multimodal input system 102 in determining intent. For example, battery life, current room and/or device temperature, whether the user is moving and at what speed, whether the user is alone or with someone else, amount of ambient light, time of day, day of week and so on may be obtained by a sensor or other means and evaluated by the system 102 to determine the intent of user input. As a more particular example, a gesture in front of a stationary computer system may be interpreted differently from the same gesture while the user is in a moving vehicle.

Other input 116 such as a user-selected operating mode, such as to turn on or off certain input devices, and/or to use a device in a different way (e.g., use a digitizer to input gestures instead of handwriting) may be fed by user selection into the multimodal input system 102. Two or more users' experiences can be enhanced if the system can find compromises between user preferences; for example, if two users are inputting data in the same room, the system may provide an average light setting when one user likes well a lit environment and the other likes a darker setting.

Another possible source of input is data representing a current operating mode of the program 106. For example, a program may be currently configured to input text, in which one combined speech-and-gesture dictionary is employed by the multimodal input system 102. Later that program may be configured by the user to operate in a command-and-control mode, in which another combined speech-and-gesture dictionary is employed by the multimodal input system 102.

With the various input data and other data, a user is able to use any combination of speech, gesture, touch, keyboard, and so forth to implicitly or explicitly clarify his or her intent via the multimodal input system 102 to the program 106. By way of an explicit example, if a user wants to modify a certain architectural element in a three-dimensional scene, the user may use a gesture to point in the direction of that element, and say, "change the color of the bench that is behind the wall to red." The multimodal input system 102 accesses a combined dictionary or the like to detect that the intent of the pointing gesture is to select an element based upon the current mode of the program that is presenting the scene (as well as based upon possibly other data). The multimodal input system 102 also accesses the dictionary to send a command to the program, or text corresponding to the speech, which the program uses to change the color of that selected element (the bench) to red.

By way of another example, the system may determine that the user is talking to it, and implicitly understand that a user wants to place a phone call to her mother if she looks a picture of her mother on a display (e.g., in a contacts list) and makes a gesture indicative of a telephone call (e.g., points to a telephone icon, or simulates holding a phone to her ear). In this example, gaze tracking is one input modality, and gesture is another input modality, which when combined with the identity of the currently displayed image, implicitly determines the intent of the user.

By way of a multi-user example, consider multiple users, whether detected by the same or multiple cameras (e.g., one remote), working together on an electronic display or within a shared virtual workspace. One user's handwriting on a tablet or the display itself may write text to the display, while another user's gesture may select the text, move it, erase it, and so forth. The environmental data may differ for each, and whether or not the users are in the same room or are remote from one another may be used as a factor in interpreting the multimodal input.

Figure 2:
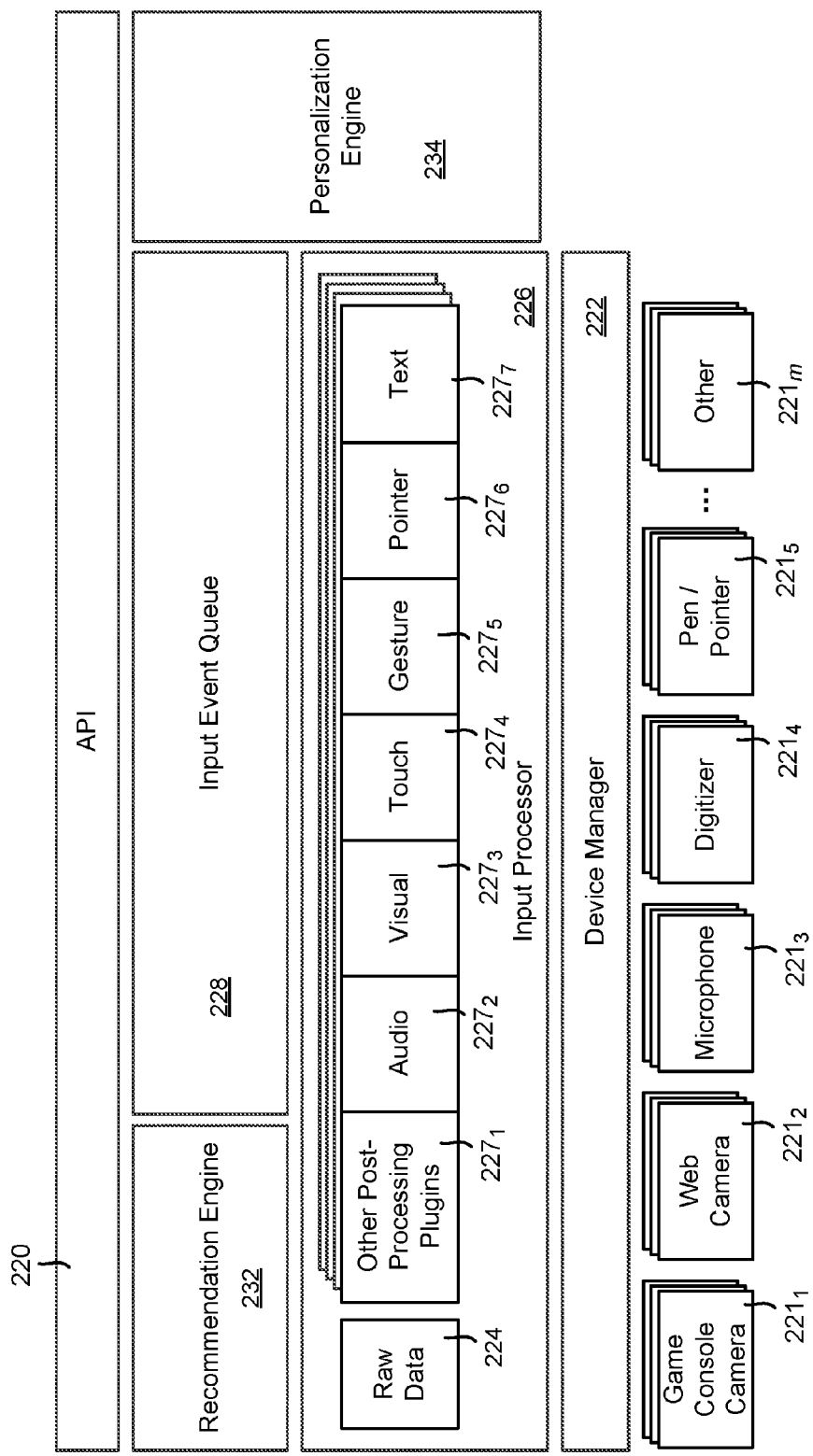
FIG. 2 is representation of one implementation of an architecture suitable for use with a multimodal input system.

FIG. 2 is an architectural diagram showing one example embodiment of the multimodal input system 102, which may be coupled to a program via an API 220. Note that to accommodate multiple users, each device is represented by multiple blocks in FIG. 2, although it is understood that not all represented devices need be present in a given configuration, or that more input devices or different input devices than those shown in the examples shown may be present.

In FIG. 2, a set of one or more game console cameras, web cameras, microphones, digitizers, pens/pointing devices and "other" are shown as the input devices $221_1$-$221_n$, respectively, that correspond to possible input modalities. Other input modalities that may be utilized include electronic ink from a pen device, gaze (direction, elapsed time), proximity sensing, speech, air gestures, body position/body language, facial expression, mirroring as reinforcement (e.g., looking in the direction of pointing, miming), touch, multi-touch mouse, brainwave computer input, keyboard, in-air mouse (like soap), musical instrument (e.g., MIDI), manipulating a physical interface (like a glove, or haptic interface), and so forth. Mood sensing such as combining facial expression with facial color changes, temperature, grip pressure and/or other possible indicators of mood is another feasible input modality.

The various input devices $221_1$-$221_m$ provide input signals to a device manager 222, which in turn provides appropriate raw data 224 for processing via an input processor 226. These data may be kept synchronized by a time stamp or the like, as well as maintained in association with the type of input device that provided them.

The input processor 224, which may be hard-coded to an extent and/or include plug-ins $227_1$-$227_7$ for handling the input data of various modalities, processes the raw data into input events which are queued in an input event queue 228 for processing by a recommendation engine 232. As shown in FIG. 2, other post-processing plugins (or hardcoded code), audio, visual, touch, gesture, pointer and text processing components $227_1$-$227_n$ are shown as examples, respectively, however it is understood that not all represented components need be present in a given configuration, or that more components or different components than those shown in the examples shown may be present.

As part of the processing and queuing, the input processor 226 may communicate with a personalization engine 234, which, as described above, may access dictionaries 110 and/or preference data 112 to determine whether the raw data 224 corresponds to intended input or not, and if so, how the data is to be queued. For example, the personalization engine 234 may access a custom speech and gesture dictionary to convert audio data to text, with the text then queued. Although not explicitly shown, the personalization engine 234 may incorporate or otherwise may be coupled to appropriate recognition engines for this purpose. Note that the receiving program itself may comprise such a recognition engine, or may communicate with one, in which event pre-recognized data may be sent by the multimodal input system 102 to the program 106.

The recommendation engine 232 may process the data in the input event queue 228 to make recommendations to the receiving program. Note that recommendations may be in the form of converted commands, text, pointer data, and so forth, as appropriate for the receiving program. Note that the receiving program may forward the recommendations to another program; for example, the receiving program may route the recommendations to whatever program has focus. Focus may be switched by gaze tracking data or other input recognized by the receiving program.

In making a recommendation, not only is the current event considered, but the context of preceding (and possibly subsequent) events also may be considered and/or correlated. The recommendation engine may use rules or current context from multiple sensors and users to provide final recommendations. Thus, for example, a user may say something that is converted to a command because the user has previously made a gesture (e.g., a thumbs-up) indicative of wanting to speak a command ("select word") instead of entering speech-to-text into a document. When the user stops making the thumbs-up gesture, speech will again be entered into the document as text. With respect to a subsequent command, a user may make a gesture indicating that the last statement is to be stricken; the recommendation engine can cancel ongoing recognition before sending anything to the receiving program. To this end, a dictionary for a collection of synchronous inputs may be trained (or otherwise constructed), generally like any single mode dictionary is trained. For multiuser operation, when recommending, the system can potentially include establishing a middle ground between two or more users with different preferences.

Moreover, the multimodal input system 102 allows receiving programs to contextually respond to determined intent based on recommendations generated by the personalization of user interactions. For example, the multimodal input system 102 may receive handwriting data from various sources at various times. The multimodal input system 102 may provide such handwriting data (as is or recognized as text) to the program along with intent information, such as one user intended this to be a comment to another user's text rather than to add it the primary text, based on some other detected input (or absence thereof) at the time of commenting.

Thus, the system enables applications or helps applications to manage multiple input modalities for a single user or groups of users. The input devices may be physically attached or remote, and, for example, may be synthesized as if coming from an input device but actually coming from a different (e.g., remote) multimodal input system of another user.

Figure 3:
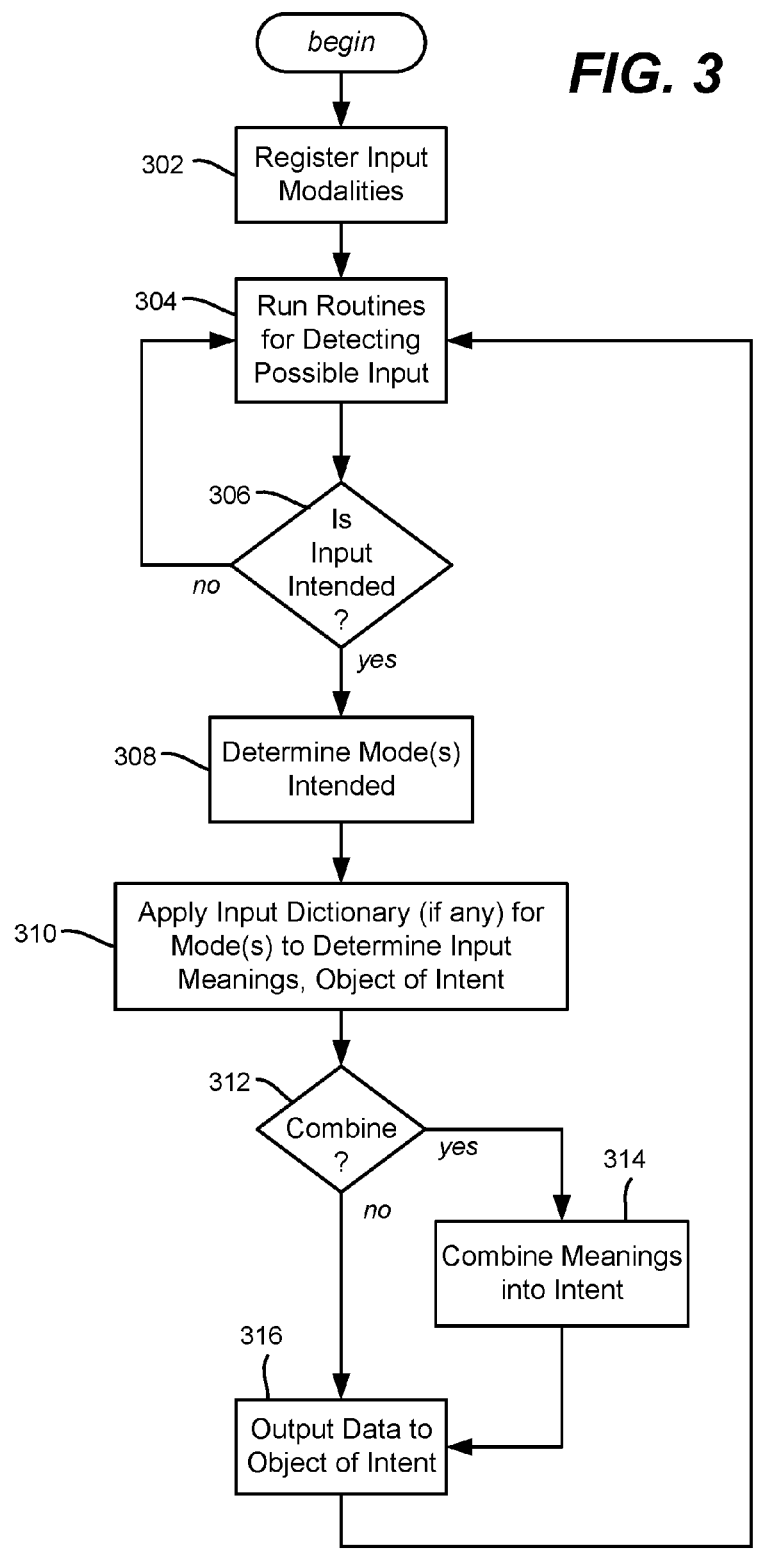
FIG. 3 is a flow diagram showing example steps that may be performed by a multimodal input system.

FIG. 3 is a flow diagram representing example steps of a multimodal input system. At step 302, the system registers what input devices/modalities are available. Note that this may be updated at any time, such as by plug-and-play that allows devices to be dynamically connected and/or removed. Further note that user preference data, environmental data and other input (e.g., information from a program) may be factors in whether a device is available for multimodal input. For example, a user may specify that the digitizer input be treated as independent input rather than combined with other input by the multimodal input system. This may be accomplished by bypassing the multimodal input system, or by having the multimodal input system simply pass digitizer data without processing it for combinations or otherwise (e.g., pass it pre-recognized).

As represented by step 304, the multimodal input system runs routines to judge or infer what modalities are being attempted by the user; note that something like keyboard typing may be automatically assumed to be input, although as described above, user preferences or other data may specify that it not be intended to be multimodal input. Such a routine may make a basic yes/no decisions for certain actions, e.g., whether a gesture is intended to convey input or whether the user is just moving his arms in some way. A user may be speaking into a telephone, but does not want the microphone input to be used for speech recognition. A routine may be more complex, e.g., whether the user is gazing at the screen or not, and if so, at what screen coordinates. Note that environmental input may factor in, as a user that is in a moving car may not be moving her arms for gesture purposes, whereas the same movement when stationary may mean an input gesture. Step 306 represents the evaluation that detects whether input is being attempted, including accessing user preference data, environmental data and/or other data in making the decision.

To determine input intent, usage models are employed (and may be regularly updated, such as by using machine learning) to evaluate whether a particular input mode, or combination of modes, are relevant. For example, a user may be talking to someone else, so if the system hears speech, it needs to judge the probability that the user is addressing the system. Similar models for gaze, gesture, touch and so forth may be employed. When the models result in ambiguous conditions, the system may move into a disambiguation mode, such as to solicit further input from the user to clarify intent.

If input is being intended, step 308 determines each mode, which is used to apply an input dictionary to determine the meaning of that mode, or a combined dictionary for a combined mode if input modalities are related. Note that for some modes such as keyboard entry, there may not be a dictionary. Further, step 308 may be used to determine the object of the intent. For example, the user may be gazing at or pointing to a particular program window on a display while speaking; in this event, the program the user intends to receive the input is the object of the intent. In the above example of calling a person currently being displayed, the object is a cell phone, VoIP telephone or the like.

Step 312 represents determining whether the inputs of at least two modes are related and thus to be combined, which may be performed by a trained usage model. This is not always so, as, for example, the user may be doing only one thing with respect to input, or may be doing something that is independent. For example, a user may be handwriting into one program while gazing at the digitizer; this does not mean that the handwriting is to be discarded because the gaze tracking is not to the window to which the handwriting is directed. Step 314 represents combining the meanings into an intent, if appropriate, e.g., to treat speech as a command for command-and-control purposes (instead of for recognition as document text) based upon a detected user gesture. Note that a combined dictionary may be used at step 314.

Step 316 represents outputting appropriate data to the object of the intent. Note that this may comprise any recognition, reformatting, conversion (e.g., of a gesture to a command code) and so on as expected by the receiving program.

In this manner, each input modality is regularly (e.g., continuously) weighted and evaluated for relevance. The system may apply biometric, geospatial, and environmental data to further judge the relevance of input modes, and/or to further infer user intent. The user does not have to select an input modality, but rather uses the modalities as desired, whereby a user may use multiple modalities together to explicitly clarify intent.

Exemplary Operating Environment

Figure 4:
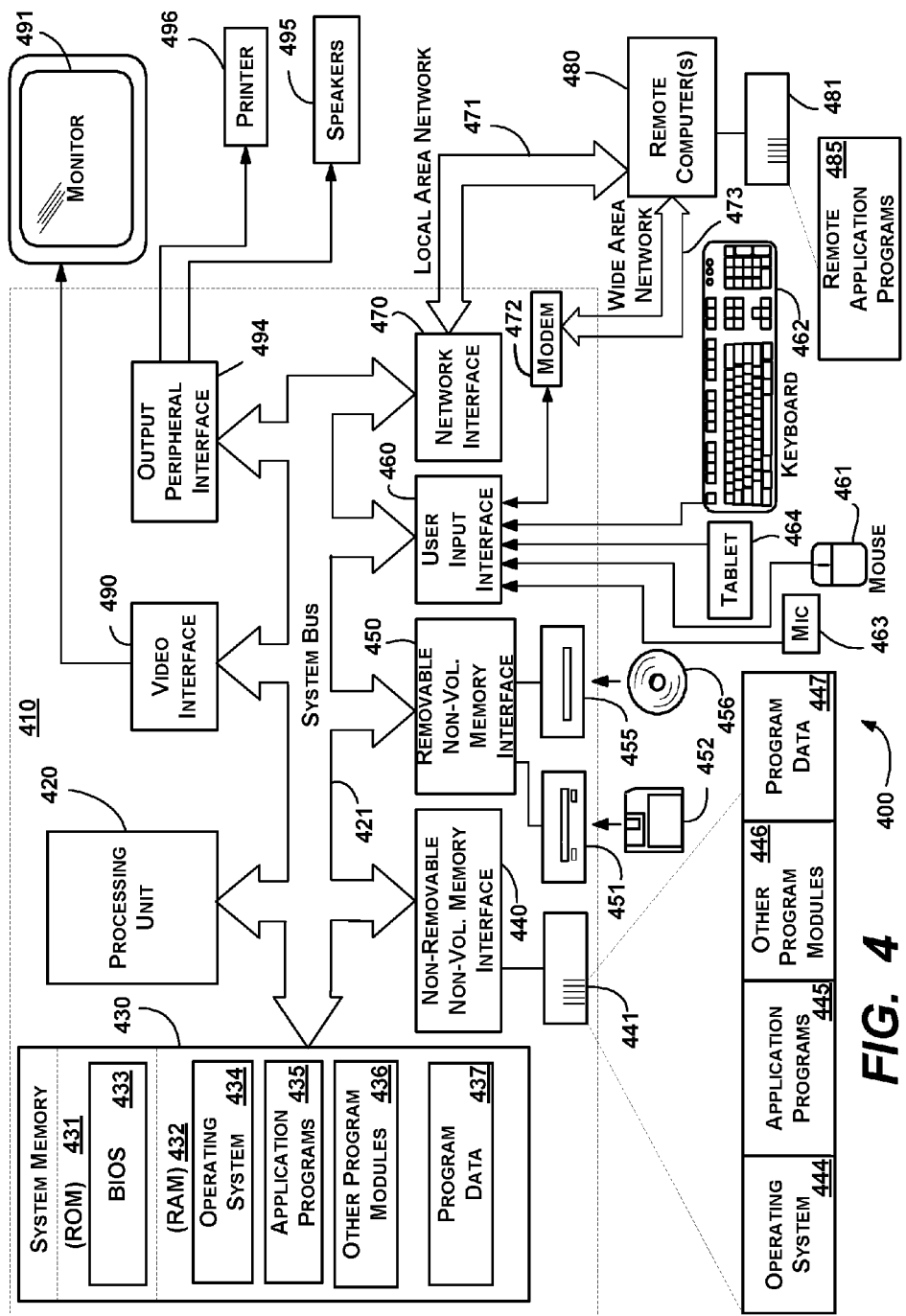
FIG. 4 shows an illustrative example of a computing environment into which various aspects of the present invention may be incorporated.

FIG. 4 illustrates an example of a suitable computing and networking environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed at least in part on at least one processor, the method comprising:
   receiving sets of input data corresponding to a plurality of input modalities, the received sets of input data including a first set of input data and a second set of input data, the first set of input data being associated with a first input modality from the plurality of input modalities, the second set of input data being associated with a second input modality from the plurality of input modalities, the first input modality being a speech or text input modality and the second input modality being a gesture input modality;
   selecting the first set of input data and the second set of input data;
   identifying, within a dictionary, speech or text input for the first set of input data and a gesture for the second set of input data to determine a meaning of a combination of the first and second set of input data; and
   providing output data for input by a program, the output data corresponding to the meaning of the first and second set of input data.

2. The method of claim 1, further comprising providing personalization information for determining the meaning of the sets of input data.

3. The method of claim 1 wherein the first input device is associated with a first user and the second input device is associated with a second user.

4. The method of claim 1 wherein accessing a dictionary to determine a meaning of the first and second set of input data comprises accessing a dictionary to determine a combined meaning of the first and second set of input data.

5. The method claim 1 wherein at least one of the first set of input data and the second set of input data is received as input that is synthesized from output of another device.

6. The method of claim 1 further comprising determining that the first set of input data is related to the second set of input data by accessing preference data.

7. The method of claim 6 wherein determining that the first set of input data is related to the second set of input data further comprises accessing data provided by at least one sensor.

8. A system, comprising:
   a plurality of input devices that provide data corresponding to input modalities;
   one or more processors programmed to:
      receive, from the input devices, sets of input data corresponding to the input modalities, the received sets of input data including a first set of input data and a second set of input data, the first set of input data being associated with a first input modality from the plurality of input modalities, the second set of input data being associated with a second input modality from the plurality of input modalities, the first input modality being a speech or text input modality and the second input modality being a gesture input modality;

select the first set of input data and the second set of input data;

identify, within a dictionary, speech or text input for the first set of input data and a gesture for the second set of input data to determine a meaning of a combination of the first and second set of input data; and provide output data for input by a program, the output data corresponding to the meaning of the first and second set of input data.

9. The system of claim 8 wherein a first input device from the plurality of input devices inputs raw data from one user and a second input device from the plurality of input devices inputs raw data from another user.

10. The system of claim 8 wherein at least one of the plurality of input devices is coupled to the system via a remote connection.

11. The system of claim 8 wherein the plurality of input devices include one or more of the following: a camera, a microphone, a digitizer, a pen, and a pointing device.

12. The system of claim 8 wherein the one or more processors include one or more of the following: an audio processing component, a visual processing component, a touch processing component, a gesture processing component, a pointer processing component and a text processing component.

13. The system of claim 8 further comprising a personalization engine configured to provide personalization information for determining the meaning of a subset of input events.

14. The system of claim 13 wherein the personalization engine accesses multiple dictionaries to provide the personalization information.

15. The system of claim 8 further comprising a combined dictionary corresponding to the first and second input modalities, wherein the combined dictionary is selected from a plurality of combined dictionaries based on a current operating mode of the program configured to receive the meaning of a subset of input events.

16. The system of claim 8 wherein the one or more processors are further programmed to use environmental input in determining the meaning of the first and second set of input data.

17. The system of claim 8 wherein the one or more processors are further programmed to use preference data in determining the meaning of the first and second set of input data.

18. One or more computer-readable storage devices having computer-executable instructions, that cause a processor to perform operations comprising:

receiving sets of input data corresponding to a plurality of input modalities, the received sets of input data including a first set of input data and a second set of input data, the first set of input data being associated with a first input modality from the plurality of input modalities, the second set of input data being associated with a second input modality from the plurality of input modalities, the first input modality being a speech or text input modality and the second input modality being a gesture input modality;

selecting the first set of input data and the second set of input data;

identifying, within a dictionary, speech or text input for the first set of input data and a gesture for the second set of input data to determine a meaning of a combination of the first and second set of input data; and providing output data for input by a program, the output data corresponding to the meaning of the first and second set of input data.

19. The one or more computer-readable storage devices of claim 18 wherein an intent of a user is based at least in part on the first input modality and the second input modality.

20. The one or more computer-readable storage devices of claim 18 wherein the dictionary is associated with the first input modality and the second input modality.

* * * * *